(12) United States Patent
Iwata et al.

(10) Patent No.: US 8,563,673 B2
(45) Date of Patent: Oct. 22, 2013

(54) PROPYLENE-BASED RESIN MOLDED ARTICLE AND METHOD FOR PRODUCING THE SAME

(75) Inventors: Takafumi Iwata, Kakegawa (JP); Hideki Oshima, Bartlesville, OK (US); Satoru Moritomi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 607 days.

(21) Appl. No.: 12/301,784

(22) PCT Filed: May 29, 2007

(86) PCT No.: PCT/JP2007/061255
§ 371 (c)(1),
(2), (4) Date: Oct. 5, 2010

(87) PCT Pub. No.: WO2007/139227
PCT Pub. Date: Dec. 6, 2007

(65) Prior Publication Data
US 2011/0020625 A1    Jan. 27, 2011

(30) Foreign Application Priority Data

May 31, 2006   (JP) .................................. 2006-151281

(51) Int. Cl.
*C08F 10/06*     (2006.01)
*C08F 110/06*    (2006.01)
*C08F 210/06*    (2006.01)
*B29C 47/36*     (2006.01)

(52) U.S. Cl.
USPC ......... 526/351; 526/348; 428/220; 264/328.1

(58) Field of Classification Search
USPC ........................................... 526/351
See application file for complete search history.

(56) References Cited

U.S. PATENT DOCUMENTS

| | | | |
|---|---|---|---|
| 5,723,527 A | 3/1998 | Sadatoshi et al. | |
| 8,017,711 B2 * | 9/2011 | Sakurai et al. | ................ 526/351 |
| 2002/0035191 A1 | 3/2002 | Hirakawa et al. | |

FOREIGN PATENT DOCUMENTS

| | | | |
|---|---|---|---|
| JP | 62-256837 A | 11/1987 | |
| JP | 62-283111 A | 12/1987 | |
| JP | 7-70334 A | 3/1995 | |
| JP | 8-197640 A * | 8/1996 | ............ B29D 31/00 |
| JP | 8-302108 A | 11/1996 | |
| JP | 9-278954 A | 10/1997 | |
| WO | 01/81074 A1 | 11/2001 | |

* cited by examiner

*Primary Examiner* — Rip A. Lee
(74) *Attorney, Agent, or Firm* — Sughrue Mion, PLLC

(57) ABSTRACT

A propylene-based resin molded article satisfying the following requirements (1) through (4):
Requirement (1) Lc/La≤1.50
Requirement (2) Lc≥10.0
Requirement (3) $F_1 \geq 0.07$
Requirement (4) $F_2 \geq 0.06$
wherein in Requirements (1) through (4), La denotes the distance (unit: nm) between crystalline lamellae calculated from the long-period distance calculated from a small-angle X-ray scattering profile and the degree of crystallization calculated from the amount of heat of fusion measured by differential scanning calorimetry, Lc denotes the thickness (unit: nm) of a crystalline lamella calculated from the distance between crystalline lamellae and the long-period distance, $F_1$ denotes the degree of orientation calculated from the infrared dichroic ratio measured at a wave number of 997 $cm^{-1}$, and $F_2$ denotes the degree of orientation calculated from the infrared dichroic ratio measured at a wave number of 973 $cm^{-1}$.

6 Claims, No Drawings

PROPYLENE-BASED RESIN MOLDED ARTICLE AND METHOD FOR PRODUCING THE SAME

TECHNICAL FIELD

The present invention relates to a propylene-based resin molded article and a method for producing the same. Particularly, it relates to a propylene-based resin molded article excellent in rigidity and impact strength and a method for producing the same,

BACKGROUND ART

Propylene-based resin has heretofore been used in various fields as an industrial material for automotive components, components of household electric appliances, etc.

For example, JP-A 62-256837 discloses, as a polypropylene resin molded article excellent in mechanical characteristics, temperature characteristics and hardness, a polypropylene resin molded article produced by thermally treating, at a temperature within a range of from 155 to 170° C., a molded article obtained by molding a composition comprising a polypropylene resin and a nucleating agent.

JP-A 62-283111 discloses, as a propylene copolymer excellent in mechanical characteristics, temperature characteristics and hardness, a propylene copolymer produced by thermally treating a propylene copolymer having an α-olefin unit content of from 0.5% by weight to 10% by weight and a melt flow rate of from 0.05 g/10 rain to 50 g/10 min over a temperature range from (Tm−10° C.) to (Tm+5° C.), where Tm represents the melting point of the propylene copolymer.

WO 01/81074 discloses, as a method for improving the rigidity and toughness of an ethylene-propylene polymer composition, a method comprising heating the polymer composition for a period of from 1 hour to 100 hours at a temperature within a range of from 75° C. to 150° C.

The polypropylene resin molded articles disclosed in the documents are not satisfactory in rigidity or impact strength and therefore their improvement are demanded.

DISCLOSURE OF THE INVENTION

An object of the present invention is to provide propylene-based resin molded articles excellent in rigidity and impact strength and methods for producing the same.

The present inventors have accomplished the present invention by finding that it is possible to improve rigidity and impact strength in a shorter time than before by producing a propylene-based resin molded article while controlling the crystal structure and the degree of orientation of molecular chains of the propylene-based resin. The present invention is specifically as follows.

In a first aspect, the present invention is directed to a propylene-based resin molded article satisfying the following requirements (1) through (4):
Requirement (1) Lc/La≥1.50
Requirement (2) Lc≥10.0
Requirement (3) $F_1 \geq 0.07$
Requirement (4) $F_2 \geq 0.06$
wherein in Requirements (1) through (4),
  La denotes the distance (unit: nm) between crystalline lamellae calculated from the long-period distance calculated from a small-angle X-ray scattering profile and the degree of crystallization calculated from the amount of heat of fusion measured by differential scanning calorimetry,
  Lc denotes the thickness (unit: nm) of a crystalline lamella calculated from the distance between crystalline lamellae and the long-period distance,
  $F_1$ denotes the degree of orientation calculated from the infrared dichroic ratio measured at a wave number of 997 $cm^{-1}$, and
  $F_2$ denotes the degree of orientation calculated from the infrared dichroic ratio measured at a wave number of 973 $cm^{-1}$.

In a second aspect, the present invention is directed to a propylene-based resin molded article satisfying the following requirements (2) through (5):
Requirement (2) Lc≥10.0
Requirement (3) $F_1 \geq 0.07$
Requirement (4) $F_2 \geq 0.06$
Requirement (5) La≥8.5
wherein in Requirements (2) to (5),
  La denotes the distance (unit: nm) between crystalline lamellae calculated from the long-period distance calculated from a small-angle X-ray scattering profile and the degree of crystallization calculated from the amount of heat of fusion measured by differential scanning calorimetry,
  Lc denotes the thickness (unit: nm) of a crystalline lamella calculated from the distance between crystalline lamellae and the long- period distance,
  $F_1$ denotes the degree of orientation calculated from the infrared dichroic ratio measured at a wave number of 997 $cm^{-1}$, and
  $F_2$ denotes the degree of orientation calculated from the infrared dichroic ratio measured at a wave number of 973 $cm^{-1}$.

In a third aspect, the present invention is directed to a method for producing a propylene-based resin molded article, comprising:
  a filling step of filling a propylene-based resin into a mold cavity of an injection molding machine having a maximum injection pressure of P, and
  a pressure holding step of further pressurizing the propylene-based resin filled into the mold cavity at a pressure of 15% or more of the maximum injection pressure and holding the propylene-based resin under this pressure,
  wherein the melt flow rate of the propylene-based resin, as measured in accordance with ASTM D1238, is more than 0 g/10 min but not more than 5 g/10 min, and
  the propylene-based resin molded article satisfies the following requirements (1) through (4):
Requirement (1) Lc/La≤1.50
Requirement (2) Lc≥10.0
Requirement (3) $F_1 \geq 0.07$
Requirement (4) $F_2 \geq 0.06$
wherein in Requirements (1) through (4),
  La denotes the distance (unit: nm) between crystalline lamellae calculated from the long-period distance calculated from a small-angle X-ray scattering profile and the degree of crystallization. calculated from the amount of heat of fusion measured by differential scanning calorimetry,
  Lc denotes the thickness (unit: nm) of a crystalline lamella calculated from the distance between crystalline lamellae and the long-period distance,
  $F_1$ denotes the degree of orientation calculated from the infrared dichroic ratio measured at a wave number of 997 $cm^{-1}$, and
  $F_2$ denotes the degree of orientation calculated from the infrared dichroic ratio measured at a wave number of 973 $cm^{-1}$.

In a fourth aspect, the present invention is directed to a method for producing a propylene-based resin molded article, comprising:

a filling step of filling a propylene-based resin into a mold cavity of an injection molding machine having a maximum injection pressure of P, and a pressure holding step of further pressurizing the propylene-based resin filled into the mold cavity at a pressure of 15% or more of the maximum injection pressure and holding the propylene-based resin under this pressure, wherein the melt flow rate of the propylene-based resin, as measured in accordance with ASTM D1238, is more than 0 g/10 min but not more than 5 g/10 min, and the propylene-based resin molded article satisfies the following requirements (2) through (5):

Requirement (2) Lc≥10.0
Requirement (3) $F_1$≥0.07
Requirement (4) $F_2$≥0.06
Requirement (5) La≥8.5
wherein in Requirements (2) to (5), La denotes the distance (unit: nm) between crystalline lamellae calculated from the long-period distance calculated from a small-angle X-ray scattering profile and the degree of crystallization calculated from the amount of heat of fusion measured by differential scanning calorimetry, Lc denotes the thickness (unit: nm) of a crystalline lamella calculated from the distance between crystalline lamellae and the long-period distance, $F_1$ denotes the degree of orientation calculated from the infrared dichroic ratio measured at a wave number of 997 $cm^{-1}$, and $F_2$ denotes the degree of orientation calculated from the infrared dichroic ratio measured at a wave number of 973 $cm^{-1}$.

In the present invention, the "propylene-based resin" includes not only homopolymers of propylene but also copolymers of propylene with ethylene or α-olefin having four or more carbon atoms such as those mentioned later. In a propylene-based resin molded article, the "crystalline lamella" is a crystal resulting from folding of a molecular chain of a polymer forming the propylene-based resin.

The "long-period distance (Lp)" is the distance between the centers of gravity of individual crystalline lamellae in a (crystalline lamella)-(amorphous region)-(crystalline lamella) layered structure. The "distance between crystalline lamellae (La)" is the distance between crystalline lamellae in the layered structure, namely, the thickness of the amorphous region. The "crystalline lamella thickness (Lc)" is the thickness of an individual crystalline lamella.

The "maximum injection pressure" refers to the maximum value of the injection pressure which a molding machine to be used can reach in the filling step and it is inherent to the injection molding machine to be used. While the specific value thereof may vary depending upon the ability of the molding machine, the maximum injection pressure is let be P in the present invention. The "molded article precursor" refers to a molded article produced via the pressure holding step, namely, a molded article before the thermal treatment step.

[Propylene-based Resin Molded Article]

As mentioned above, the present invention is directed to a propylene-based resin molded article, which is hereinafter also called a molded article, satisfying at least the following requirements (2), (3) and (4) and also satisfying the following requirement (1) or (5):

Requirement (1) Lc/La≤1.50
Requirement (2) Lc≥10.0
Requirement (3) $F_1$≥0.07
Requirement (4) $F_2$≥0.06
Requirement (5) La≥8.5
wherein in Requirements (1) through (5), La denotes the distance (unit: nm) between crystalline lamellae calculated from the long-period distance calculated from a small-angle X-ray scattering profile and the degree of crystallization calculated from the amount of heat of fusion measured by differential scanning calorimetry;

Lc denotes the thickness (unit: nm) of a crystalline lamella calculated from the distance between crystalline lamellae and the long-period distance, $F_1$ denotes the degree of orientation calculated from the infrared dichroic ratio measured at a wave number of 997 $cm^{-1}$, and $F_2$ denotes the degree of orientation calculated from the infrared dichroic ratio measured at a wave number of 978 $cm^{-1}$.

Regarding requirement (1), when Lc/La is greater than 1.50, a resulting molded article may have an insufficient impact strength. Lc/La preferably is from 0.50 to 1.50, more preferably is from 0.55 to 1.45, and even more preferably is from 0.60 to 1.40.

Regarding requirement (2), when the crystalline lamella. thickness (Lc) is less than 10.0 nm, a resulting molded article may have an insufficient flexural modulus. The crystalline lamella thickness (Lc) preferably is from 10.0 to 25.0 nm, more preferably is from 10.5 to 24.5 nm, and even more preferably is from 11.0 to 24.0 nm.

Regarding requirement (3), when the degree of orientation ($F_1$) is less than 0.07, the impact strength may be insufficient. The degree of orientation ($F_1$) is preferably from 0.07 to 0.50, more preferably from 0.08 to 0.50, and even more preferably from 0.08 to 0.40.

Regarding requirement (4), when the degree of orientation ($F_2$) is less than 0.06, the impact strength may be insufficient. The degree of orientation ($F_2$) is preferably from 0.06 to 0.50, more preferably from 0.07 to 0.50, and even more preferably from 0.07 to 0.40.

Regarding requirement (5), when the distance between crystalline lamellae (La) is less than 8.5 nm, the impact strength may be insufficient. The distance between crystalline lamellae (La) is preferably from 8.5 to 15.5 nm, more preferably from 8.7 to 15.3 nm, and even more preferably from 8.9 to 15.1 nm.

In requirements (1) through (5), the long-period distance, the distance between crystalline lamellae, the crystalline lamella thickness, and the degree of orientation are calculated by the use of conventional methods. The methods are described specifically below.

Regarding the long-period distance, a small-angle X-ray scattering profile is measured first. Then, a long-period distance is calculated using the scattering angle corresponding to the peak detected and the following Bragg's equation:

$$Lp(nm) = \lambda/2 \sin \theta$$

wherein λ represents a wavelength (0.154 (nm) is used in the present invention) and θ represents a scattering angle, The distance between crystalline lamellae is determined by substituting the long-period distance (Lp) calculated by the above-mentioned method and the degree of crystallization (χ) calculated using the amount of heat of fusion measured by differential scanning calorimetry into the following equation:

$$La(nm) = Lp(1 - 0.01 \times \chi)$$

Lc, which is a difference Lp and La, is determined from the Lp and the La calculated by the methods described above.

The degree of crystallization ($\chi$) is calculated from the amount of heat of fusion ($\Delta Hm$) measured by differential scanning calorimetry and the following equation:

$$\chi(\%) = \Delta Hm / \Delta H^{\circ}m \times 100$$

wherein the amount of heat of fusion at a degree of crystallization of 100% ($\Delta H^{\circ}m$) is a value disclosed by W. R. Krigbaum et at in Journal Polymer Science, 3, 767 (1965), namely 208 J/g.

The degrees of orientation ($F_1$ and $F_2$) are calculated from an infrared dichroic ratio (D) measured with a micro infrared spectrometer and the following equation:

$$F = (D-1)/(D+2).$$

The infrared dichroic ratio (D) is calculated as a ratio of a maximum transmission to a minimum transmission (maximum transmission/minimum transmission) detected by rotating a polarizer. In the present invention, infrared dichroic ratio (D) is measured at wave numbers of 997 cm$^{-1}$ and 973 cm$^{-1}$. The degree of orientation calculated from the D measured at 997 cm$^{-1}$ is let be $F_1$ and the degree of orientation calculated from the D measured at 973 cm$^{-1}$ is let be $F_2$.

The propylene-based resin which forms a molded article of the present invention may be a propylene homopolymer or a copolymer of propylene and at least one olefin selected from the group consisting of ethylene and $\alpha$-olefins having 4 or more carbon atoms, such as those described below. The propylene-based resin preferably has a melt flow rate which is lower than that of propylene-based resins ordinarily used for forming injection molded articles so that a molded article of the present invention will satisfy the requirements (1) through (5). Specifically, the melt flow rate measured in accordance with ASTM D1238 is not more than 5 g/10 min, preferably is not more than 4 g/10 min, and even more preferably is from 0.0001 g/10 min to 4 g/10 min. The melt flow rate of propylene-based resins used ordinarily for forming injection molded articles is 10 g/10 min or more, and preferably is 15 g/10 min or more.

The propylene-based resin molded article of the present invention may be an injection molded article, a blow molded article, a press molded article, or the like. It preferably is an injection molded article or a press molded article, and more preferably is an injection molded article.

[Method for Producing Propylene-based Resin Molded Article]

Methods for producing a "molded article according to the present invention" have a filling step and a pressure holding step.

The "filling step" is a step of filling a propylene-based resin into a mold. The form and the state of the propylene-based resin in the filling step are not particularly restricted and the resin may be in a molten state, a parison state, a powder state, etc. It preferably is in a substantially molten state because higher degrees of orientation ($F_1$ and $F_2$) of molecular chains of a polymer can be achieved when the polymer is molded. The "substantially molten state" as referred to herein includes not only a state that all molecular chains of a polymer forming the propylene-based resin are thermally moving violently but also a state that only some of such molecular chains are not thermally moving.

In order to make a resulting molded article have good appearance, it is also permitted to heat the mold prior to the filling of resin. The heating temperature preferably is from 10° C. to 70° C., and more preferably is from 20° C. to 60° C.

The method for filling the resin is selected suitably depending on the type of a desired molded article. When, for example, an injection molded article is intended to be produced, it is preferable that a filling method employing an injection molding machine be used. When a blow molded article is intended to be produced, the use of a filling method employing a blow molding machine is preferred. In particular, from the viewpoint of ability to achieving higher degrees of orientation ($F_1$ and $F_2$) of molecular chains of a polymer, the filling method preferably is the filling performed by the use of an injection molding machine.

When an injection molded article is produced, an injection molding machine having a maximum injection pressure of P is used and a propylene-based resin is filled into a space in the mold of the injection molding machine (the space is hereinafter referred to as a mold cavity) while the propylene-based resin is in a substantially molten state. The maximum injection pressure P is the maximum value of the injection pressure which a molding machine to be used can reach during the filling step as mentioned above and it is inherent to the injection molding machine to be used The maximum injection pressure P preferably is, but is not limited to, 1000 kgf/cm$^2$ to 2500 kgf/cm$^2$, for example.

The "pressure holding step" is a step of compressing and holding the propylene-based resin having been filled in the mold cavity via the filling step under a specified pressure. The provision of the pressure holding step makes it possible to increase the degree of orientation of molecular chains of the polymer when forming a molded article, As a result, it becomes possible to increase the rigidity and the impact resistance of a molded article in a shorter time than before.

The pressure applied during the pressure holding may vary depending on the size of the mold. to be used and the type of the molded article desired. For example, in the production of an injection molded article, the pressure preferably is not less than 15%, and more preferably is not less than 20% of the maximum injection pressure P. In the production of a blow molded article, the pressure preferably is not less than 15%, more preferably is not less than 20%, and most preferably is not less than 30% of the air pressure used for inflating a parison in the mold.

In the production of other types of molded articles, the pressure preferably is not less than 15%, more preferably is not less than 20% of the maximum value of the pressure applied to the mold during the filling of the resin (i.e., the maximum injection pressure).

The pressure holding time preferably is from 0.5 seconds to 60 seconds, and more preferably is from 1 second to 50 seconds. The temperature of the mold during the pressure holding preferably is from 10° C. to 70° C., and more preferably is from 20° C. to 60° C.

While the method of measuring the pressure during the pressure holding may vary depending on the type of the molded article desired, the pressure is measured generally by the use of a pressure gauge provided in the molding machine.

The method of the present invention for producing a propylene-based resin article may further comprise a step of thermally treating a molded article precursor formed via the pressure holding step. This thermal treatment makes it possible to increase mechanical properties of a molded article in a shorter time. The heating temperature is from 150° C. to 170° C., preferably is from 150° C. to 165° C., and more preferably is from 150° C. to 160° C. The heating time is from 10 minutes to 400 hours, preferably is from 10 minutes to 300 hours, and more preferably is from 10 minutes to 200 hours.

By setting the heating temperature at 150° C. or higher, it becomes possible to increase mechanical properties, particularly rigidity. On the other hand, by setting the heating temperature at 170° C. or lower, it becomes possible to stabilize the shape of a resulting molded article.

By setting the heating time at 10 minutes or longer, it becomes possible to increase mechanical properties, particularly impact strength. On the other hand, by setting the heating time at 400 hours or shorter, it becomes possible to prevent the propylene-based resin from decomposing and to impart sufficient mechanical properties.

Examples of the heating method include (1) a method comprising heating a mold directly at a temperature of from 150° C. to 170° C. without taking a molded article precursor out of the mold, (2) a method comprising bringing a molded article precursor into contact with a roll surface or a hot plate surface heated at a temperature of from 150° C. to 170° C., (3) a method comprising placing a molded article precursor in an oven filled with nitrogen, argon, air or the like heated at a temperature of from 150° C. to 170° C., and (4) a method comprising immersing a molded article precursor in a bath filled with an inert liquid such as silicone oil or water heated at a temperature of from 150° C. to 170° C.

The propylene-based resin used in the present invention is as described previously, a propylene homopolymer or a copolymer of propylene with at least one olefin selected from the group consisting of ethylene and α-olefins having four or more carbon atoms. (The propylene homopolymer may contain 1.0% by weight or less of ethylene or α-olefin having 4 or more carbon atoms, wherein the weight of the propylene hompolymer is let be 100% by weight.)

The propylene-based resin preferably has a melt flow rate lower than that of propylene-based resins ordinarily used for forming molded articles so that a molded article of the present invention will satisfy the requirements (1) through (5). Specifically, the melt flow rate measured in accordance with ASTM D1238 is not more than 5 g/10 min, preferably is not more than 4 g/10 min, and even more preferably is from 0.0001 g/10 min to 4 g/10 min When the melt flow rate is greater than 5 g/10 min, it tends to become difficult to improve the rigidity and impact strength of a resulting molded article, Examples of the copolymer of propylene with at least one olefin selected from the group consisting of ethylene and α-olefins having 4 or more carbon atoms include propylene-based random copolymers made up of propylene and at least one olefin selected from the group consisting of ethylene and α-olefins having 4 or more carbon atoms and propylene-based block copolymers having a propylene homopolymer portion and a propylene-ethylene random copolymer portions. (The propylene homopolymer portion may contain 1% by weight or less of ethylene or an α-olefin. having 4 or more carbon atoms, wherein the total amount of the propylene homopolymer is let be 100% by weight.)

The propylene-based resin used in the present invention preferably is a propylene homopolymer or a propylene-based random copolymer, and more preferably is a propylene homopolymer.

From the viewpoint of improvement in rigidity, heat resistance or hardness, the isotactic pentad. fraction, as determined by $^{13}$C-NMR, of the propylene homopolymer, the propylene-based random copolymer and the homopolymer portion of a propylene-based block copolymer is preferably 0.94 or more.

The isotactic pentad fraction is a fraction of propylene monomer units which are present at the center of an isotactic chain in the form of a pentad unit, in other words, the center of a chain in which five propylene monomer units are meso-bonded successively, in the polypropylene molecular chain as measured by a method reported in A. Zambelli et al., Macromolecules, 6, 925 (1973), namely, by a method using $^{13}$C-NMR. The NMR absorption peaks are assigned according to the disclosure of Macromolecules, 8, 687 (1975).

Specifically, the isotactic pentad. fraction is determined as an area fraction of the mmmm peaks in the overall peak area in the methyl carbon range of a $^{13}$C-NMR spectrum According to this method, the isotactic pentad fraction of an NPL standard substance, CRM No. M19-14 Polypropylene PP/MWD/2 available from NATIONAL PHYSICAL LABORATORY, G. B. was measured to be 0.944.

From the viewpoint of improvement in mechanical properties, particularly impact strength, the intrinsic viscosity ([η], unit: dl/g) of the propylene-based resin used in the present invention preferably is not less than 1.0 dl/g, more preferably is not less than 1.5 dl/g, and even more preferably is not less than 2.0 dl/g.

The molecular weight distribution, namely the ratio of the weight-average molecular weight (Mw) to the number-average molecular weight (Mn), Mw/Mn, preferably is from 3 to 7, and more preferably is from 3 to 5.

The propylene-based resin used in the present invention can be produced by using a conventional polymerization catalyst and a conventional polymerization method.

Examples of such a polymerization catalyst include a catalyst system which is composed of (a) a solid catalyst component containing magnesium, titanium, halogen and an electron donor as essential components, (b) an organoaluminum compound and (c) an electron-donating component. One example of this catalyst system is a catalyst system for α-olefin polymerization which contains, as disclosed in JP-A 1-319508, JP-A 7-216017, JP-A 10-212819, etc., an organoaluminum compound, an electron-donating compound and a solid catalyst component containing a trivalent titanium compound obtained by treating, in the presence of a titanium tetrachloride and optionally an ester compound, a solid product obtained by reducing, in the presence of an organosilicon compound having a Si—O bond and optionally an ester compound, a titanium compound represented by a formula $Ti(OR_1)_a X_{4-a}$, wherein $R_1$ is a hydrocarbon group having from 1 to 20 carbon atoms, X is a halogen atom and "a" is a number satisfying $0 < a \geq 4$.

Examples of polymerization methods for producing the propylene-based resin to be used in the present invention include bulk polymerization, solution polymerization, slurry polymerization, and vapor phase polymerization. These polymerization methods may be conducted either in a batch system or in a continuous system. Any combinations thereof are also available.

The amounts of (a) the solid catalyst component, (b) the organoaluminum compound and (c) the electron-donating component used in the aforementioned polymerization methods and the method of feeding the catalyst components into polymerization vessels may be determined appropriately with reference to conventional methods of using catalysts.

The polymerization temperature typically is from –30° C. to 300° C., and preferably is from 20° C. to 180° C. The polymerization pressure typically is from normal pressure to 10 MPa, and preferably is from 0.2 MPa to 5 MPa. Hydrogen, for example, may be used as a molecular weight regulator.

In the method of the production of a propylene-based resin used in the present invention, preliminary polymerization may be performed before the execution of polymerization (main polymerization). Examples of the method of the preliminary polymerization include a method in which preliminary polymerization is carried out in a slurry state using a solvent while feeding a small amount of propylene in the presence of (a) a solid catalyst component and (b) an organoaluminum compound.

To the propylene-based resin used in the present invention, resins other than the propylene-based resin used in the present invention and various additives may be added, if needed.

Examples of the resins other than the propylene-based resin used in the present invention include elastomers. Examples of the additives include antioxidants, UV absorbers, nucleating agents, inorganic fillers and organic fillers.

EXAMPLES

Physical properties of the samples and the specimens in Examples and Comparative Examples were measured by the methods provided below.

(1) Melt Flow Rate (MFR, unit: g/10 min)

The melt flow rate was measured at a temperature of 280° C. and a load of 21 N in accordance with ASTM D1238.

(2) Flexural Modulus (unit: MPa)

In accordance with ASTM D790, an elastic modulus at 23° C. was measured by the use of a specimen of 3.2 mm in thickness produced by injection molding.

(3) IZOD Impact Strength (unit: kJ/cm$^2$)

In accordance with JIS K7110, an IZOD impact strength at 23° C. was measured by the use of a specimen of 3.2 mm in thickness produced by injection molding and then notching.

(4) Intrinsic Viscosity ([η], unit: dl/g)

Reduced viscosities were measured at three concentrations of 0.1 g/dl, 0.2 g/dl and 0.5 g/dl using an Ubbelohde viscometer. An intrinsic viscosity was calculated by a calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely an extrapolation method in which reduced viscosities are plotted against concentrations and then concentration is extrapolated to zero. As to polypropylene, the intrinsic viscosity was measured at a temperature of 135° C. using Tetralin as a solvent.

(5) Degree of Crystallization (χ, unit: %)

The degree of crystallization (χ) was determined by the use of a differential scanning calorimeter (mDSC (Q100)) manufactured by TA Instruments Japan. About 6 mg of thin section prepared by slicing the central portion of a molded piece for an IZOD test was sealed in an aluminum pan. Then, the sample was cooled from room temperature to −90° C. and was held for 5 minutes. Subsequently, it was heated to 200° C. at a rate of 10° C./rain. When the temperature was increased from 60° C. to 180° C., a heat flow curve was measured. From the area (ΔHm) of a fusion peak in the heat flow curve and the following equation [1], the degree of crystallization (χ) was calculated, where the modulation conditions in the measurement were ±0.796° C. and a cycle of 30 seconds:

$$\chi(\%) = \Delta Hm / \Delta H°m \times 100 \quad [1]$$

wherein the amount of heat of fusion (ΔH°m) at a degree of crystallization of 100% is a value disclosed by W. R. Krigbaum et al. in Journal Polymer Science, 3, 767 (1965), namely 208 J/g.

(6) Long-period Distance (Lp, unit: nm)

A specimen was subjected to a Through-View measurement by using a NANO-Viewer (MicroMax-007) manufactured by Rigaku Corporation, so that a small angle X-ray scattering pattern was measured. Then, a long-period distance was calculated from the formula [2] on the basis of Bragg's equation:

$$Lp(nm) = \lambda / 2 \sin \theta \quad [2]$$

wherein λ is a wavelength of 0.154 nm, and θ is a scattering angle.

(7) Crystalline Lamella Thickness (Lc, unit: nm), Distance Between Crystalline Lamellae (La, unit: nm)

The crystalline lamella thickness (Lc) and the distance between crystalline lamellae (La) were calculated from the degree of crystallization (χ) and the long-period distance (Lp) by the use of the following formula [3]:

$$La(nm) = Lp(1 - 0.01 \times \chi) \quad [3]$$

(8) Degree of Orientation ($F_1$ and $F_2$, unit: −)

The degrees of orientation ($F_1$ and $F_2$) were determined by the following procedure.

First, a thin section of 1 mm in the MD (flow direction), 3 mm in the ND (thickness direction) and 6 μm in the MD (width direction) was prepared using a microtome.

Subsequently, using a micro infrared spectrometer (IMV-400 manufactured by JASCO Corporation), an infrared dichroic ratio (D) was measured at a position 500 μm away from a surface (an end in the MD) of the thin section. The measurement of the infrared spectrum was performed by the transmission method using an MCT detector at a resolution of 4 cm$^{-1}$ and 16 integrations. The infrared dichroic ratio (D) was calculated as a ratio of the maximum transmission to the minimum transmission (maximum transmission/minimum transmission) detected by rotating a polarizer which was located on the light path. The infrared dichroic ratio (D) was measured at wave numbers of 997 cm$^{-1}$ and 973 cm$^{-1}$.

The degrees of orientation ($F_1$ and $F_2$) were calculated from the infrared dichroic ratio (D) using the following formula [4]:

$$F(\cdot) = (D-1)/(D+2) \quad [4]$$

(9) Thermal Treatment

[Method 1]

Thermal treatment was conducted by hanging, in a gear oven, a specimen having a hole of 1 mm in diameter formed with a bench drill at a position about 3.0 mm away from the top of the specimen. The temperature and the time of the thermal treatment are shown in Table 1.

[Method 2]

Thermal treatment was conducted by placing a specimen in a stainless steal container of 20 cm in length, 20 mm in width and 2 cm in height put in a gear oven, and sealing the container with a stainless steal plate of 22 cm in length, 22 cm in width and 0.5 cm in thickness. The temperature and the time of the thermal treatment are shown in Table 1.

The propylene-based resins used are propylene homopolymers produced by using a catalyst disclosed in JP-A 10-212319 (PP-3, PP-5, PP-6, PP-7), propylene-ethylene copolymers (PP-1, PP-2), and PP-4 which was prepared by melt-kneading PP-1 together with sodium 2,2-methylenebis (4,6-di-tert-butylphenyl)phosphate.

PP-1 (Propylene-based Resin)

Propylene-ethylene copolymer having an intrinsic viscosity of 2.9 dl/g, an MFR of 0.5 g/10 min, an ethylene content of 0.3% by weight and an isotactic pentad fraction of 0.965.

PP-2 (Propylene-based Resin)

Propylene-ethylene copolymer having an intrinsic viscosity of 2.2 dl/g, an MFR of 1.3 g/10 min, an ethylene content of 0.3% by weight and an isotactic pentad fraction of 0.966.

PP-3 (Propylene-based Resin)

Propylene homopolymer having an intrinsic viscosity of 2.0 dl/g, an MFR of 3.0 g/10 min and an isotactic pentad fraction of 0.975.

PP-4 (Propylene-based Resin)

Propylene-based resin obtained by mixing 100 parts by weight of a propylene-based resin PP-1 with 0.2 parts by weight of sodium 2,2-methylenebis(4,6-di-tert-butylphenyl)

phosphate (commercial name: ADEKA STAB NA-11, produced by ADEKA Corp.) and melt-kneading the mixture in a single-screw extruder of 40 mm in diameter conditioned at a cylinder temperature of 230° C. and a screw rotation speed of 100 rpm.

PP-5 (Propylene-based Resin)

Propylene homopolymer having an intrinsic viscosity of 1.5 dl/g, an MFR of 8.0 g/10 min and an isotactic pentad fraction of 0.980.

PP-6 (Propylene-based Resin)

Propylene homopolymer having an intrinsic viscosity of 3.2 dl/g, an

MFR of 0.25 g/10 min and an isotactic pentad fraction of 0.980.

PP-7 (Propylene-based Resin)

Propylene homopolymer having an intrinsic viscosity of 3.9 dl/g, an MFR of 0.06 g/10 min and an isotactic pentad fraction of 0.980.

Example 1

A specimen was produced by molding a propylene-based resin PP-1 with an injection molding machine (IS100EN manufactured by Toshiba Machine Co., Ltd.; maximum injection pressure=2000 kgf/cm$^2$; maximum injection rate=113 cm$^3$/sec) conditioned at a cylinder temperature of 260° C. and a mold temperature of 50° C. The specimen was subjected to thermal treatment (method 1) at 155° C. for 24 hours in a gear oven. Using the specimens after the thermal treatment, the degree of crystallization $\chi$, the long-period distance Lp, the crystal lamella. thickness Lc, the distance between crystal lamellae La, the flexural modulus and the IZOD impact strength were measured. The result is shown in Table 1.

Example 2

The operations of Example 1 were repeated except for using PP-2 instead of PP-1 as a propylene-based resin. The result is shown in Table 1.

Example 3

The operations of Example 1 were repeated except for using PP-3 instead of PP-1 as a propylene-based resin and setting the cylinder temperature at 280° C. instead of 260° C. The result is shown in Table 1.

Example 4

The operations of Example 1 were repeated except for using PP-4 instead of PP-1 as a propylene-based resin. The result is shown in Table 1.

Comparative Example 1

The operations of Example 1 were repeated except for omitting the thermal treatment. The results are shown in Table 2.

Comparative Example 2

The operations of Example 2 were repeated except for omitting the thermal treatment. The results are shown in Table 2.

Comparative Example 3

The operations of Example 3 were repeated except for omitting the thermal treatment. The results are shown in Table 2.

Comparative Example 4

The operations of Example 4 were repeated except for omitting the thermal treatment. The results are shown in Table 2.

Comparative Example 5

A specimen was produced by molding a propylene-based resin PP-5 with an injection molding machine (IS100EN manufactured by Toshiba Machine Co., Ltd.; maximum injection pressure=2000 kgf/cm$^2$; maximum injection rate=113 cm$^3$/sec) conditioned at a cylinder temperature of 230° C. and a mold temperature of 50° C. Using the specimens, the degree of crystallization $\chi$, the long-period distance Lp, the crystal lamella thickness Lc, the distance between crystal lamellae La, the flexural modulus and the IZOD impact strength were measured. The results are shown in Table 2.

TABLE 1

|  | Example | | | |
| --- | --- | --- | --- | --- |
|  | 1 | 2 | 3 | 4 |
| Propylene-based resin | PP-1 | PP-2 | PP-3 | PP-4 |
| Thermal treatment time (hr) | 24 | 24 | 24 | 24 |
| Thermal treatment temperature (° C.) | 155 | 155 | 155 | 155 |
| Long-period distance (nm) | 23.1 | 20.7 | 20.7 | 24.0 |
| Degree of crystallization (%) | 55.2 | 56.7 | 58.3 | 57.9 |
| Crystalline lamella thickness (Lc: nm) | 12.7 | 11.7 | 12.1 | 13.9 |
| Distance between crystalline lamellae (La: nm) | 10.4 | 9.0 | 8.6 | 10.1 |
| Lc/La | 1.23 | 1.31 | 1.40 | 1.38 |
| Flexural modulus (MPa) | 1850 | 1810 | 2010 | 2040 |
| IZOD impact strength (kJ/cm$^2$) | 55.2 | 36.9 | 29.5 | 19.7 |

TABLE 2

|  | Comparative Example | | | | |
| --- | --- | --- | --- | --- | --- |
|  | 1 | 2 | 3 | 4 | 5 |
| Propylene-based resin | PP-1 | PP-2 | PP-3 | PP-4 | PP-5 |
| Thermal treatment time (hr) | — | — | — | — | — |
| Thermal treatment temperature (° C.) | — | — | — | — | — |
| Long-period distance (nm) | 14.3 | 13.7 | 13.7 | 15.3 | 12.5 |
| Degree of crystallization (%) | 46.1 | 46.7 | 48.2 | 49.3 | 49.7 |
| Crystalline lamella thickness (Lc: nm) | 6.6 | 6.4 | 6.6 | 7.5 | 6.2 |
| Distance between crystalline lamellae (La: nm) | 7.7 | 7.3 | 7.1 | 7.8 | 6.3 |
| Lc/La | 0.85 | 0.88 | 0.93 | 0.97 | 0.99 |
| Flexural modulus (MPa) | 1580 | 1470 | 1610 | 1540 | 1610 |
| IZOD impact strength (kJ/cm$^2$) | 5.2 | 4.6 | 3.8 | 3.9 | 1.8 |

Examples 5 to 13

Injection molding and thermal treatment (method 2) were conducted under the conditions provided in Table 3. The specimens had good appearance without remarkable sink marks or other defects. The results are shown in Tables 5 and 6.

Comparative Examples 6 to 8

Injection molding and thermal treatment (method 2) were conducted under the conditions provided in Table 4. The specimens had good appearance without remarkable sink marks or other defects. The results are shown in Table 7.

TABLE 3

|  | Example | | | | | | | | |
|---|---|---|---|---|---|---|---|---|---|
|  | 5 | 6 | 7 | 8 | 9 | 10 | 11 | 12 | 13 |
| Propylene-based resin | PP-1 | PP-1 | PP-1 | PP-1 | PP-1 | PP-1 | PP-1 | PP-6 | PP-7 |
| Molding conditions | | | | | | | | | |
| Injection temperature (° C.) | 260 | 260 | 260 | 300 | 300 | 260 | 260 | 260 | 260 |
| Held pressure (%) | 50 | 33 | 33 | 33 | 50 | 33 | 50 | 33 | 33 |
| Injection speed (%) | 35 | 35 | 50 | 35 | 35 | 35 | 35 | 35 | 35 |
| Mold temperature (° C.) | 50 | 50 | 50 | 50 | 50 | 30 | 30 | 50 | 50 |
| Thermal treatment conditions | | | | | | | | | |
| Temperature (° C.) | 155 | 155 | 155 | 155 | 155 | 155 | 155 | 155 | 155 |
| Time (Hr) | 0.5 | 0.5 | 0.5 | 0.5 | 0.5 | 0.5 | 0.5 | 0.5 | 0.5 |

TABLE 4

|  | Comparative Example | | | |
|---|---|---|---|---|
|  | 6 | 7 | 8 | 9 |
| Propylene-based resin | PP-1 | PP-1 | PP-1 | PP-1 |
| Molding conditions | | | | |
| Injection temperature (° C.) | 260 | 300 | 260 | 260 |
| Held pressure (%) | 10 | 10 | 10 | 10 |
| Injection speed (%) | 35 | 35 | 35 | 50 |
| Mold temperature (° C.) | 50 | 50 | 30 | 50 |
| Thermal treatment conditions | | | | |
| Thmperature (° C.) | 155 | 155 | 155 | 155 |
| Time (Hr) | 0.5 | 0.5 | 0.5 | 0.5 |

TABLE 5

|  | Example | | | | | |
|---|---|---|---|---|---|---|
|  | 5 | 6 | 7 | 8 | 9 | 10 |
| Long-period distance (nm) | 23.2 | 24.0 | 22.6 | 22.6 | 22.6 | 22.6 |
| Degree of crystallization (%) | 57.1 | 56.8 | 53.7 | 54.6 | 54.5 | 54.2 |
| Crystalline lamella thickness (Lc: nm) | 13.2 | 13.6 | 12.1 | 12.3 | 12.2 | 12.2 |
| Distance between crystalline lamellae (La: nm) | 10.0 | 10.4 | 10.5 | 10.3 | 10.4 | 10.4 |
| Lc/La | 1.33 | 1.32 | 1.16 | 1.20 | 1.18 | 1.18 |
| Degree of orientation | | | | | | |
| $F_1$ | 0.12 | 0.18 | 0.26 | 0.30 | 0.16 | 0.20 |
| $F_2$ | 0.09 | 0.11 | 0.17 | 0.23 | 0.14 | 0.17 |
| Flexural modulus (MPa) | 2290 | 2250 | 2230 | 2170 | 2080 | 2050 |
| IZOD impact strength (kJ/cm$^2$) | 33.5 | 37.2 | 28.4 | 26.6 | 21.4 | 38.7 |

TABLE 6

|  | Example | | |
|---|---|---|---|
|  | 11 | 12 | 13 |
| Long-period distance (nm) | 23.2 | 23.7 | 24.0 |
| Degree of crystallization (%) | 52.8 | 57.7 | 57.3 |
| Crystalline lamella thickness (Lc: nm) | 12.2 | 13.7 | 13.7 |
| Distance between crystalline lamellae (La: nm) | 11.0 | 10.0 | 10.3 |
| Lc/La | 1.12 | 1.36 | 1.34 |
| Degree of orientation | | | |
| $F_1$ | 0.12 | 0.10 | 0.25 |
| $F_2$ | 0.08 | 0.12 | 0.14 |

TABLE 6-continued

| | Example | | |
|---|---|---|---|
| | 11 | 12 | 13 |
| Flexural modulus (MPa) | 2230 | 2500 | 2180 |
| IZOD impact strength (kJ/cm$^2$) | 23.1 | 19.9 | 51.9 |

TABLE 7

| | Comparative Example | | | |
|---|---|---|---|---|
| | 6 | 7 | 8 | 9 |
| Long-period distance (nm) | 22.6 | 22.6 | 22.6 | 23.2 |
| Degree of crystallization (%) | 56.8 | 53.2 | 55.7 | 55.4 |
| Crystalline lamella thickness (Lc: nm) | 12.8 | 12.0 | 12.6 | 12.9 |
| Distance between crystalline lamellae (La: nm) | 9.8 | 10.6 | 10.0 | 10.3 |
| Lc/La | 1.32 | 1.14 | 1.26 | 1.24 |
| Degree of orientation | | | | |
| F$_1$ | 0.04 | 0.06 | 0.05 | 0.01 |
| F$_2$ | 0.03 | 0.05 | 0.01 | 0.01 |
| Flexural modulus (MPa) | 2140 | 2100 | 2000 | 2210 |
| IZOD impact strength (kJ/cm$^2$) | 7.0 | 5.1 | 5.7 | 4.3 |

The results described above show that the propylene-based molded articles of the present invention are high in rigidity and excellent in IZOD impact strength.

Industrial Applicability

The present invention makes it possible to provide a propylene-based resin molded article having a higher rigidity and a higher impact strength in a shorter time than conventional technologies.

The invention claimed is:

1. A molded article made of a propylene-based resin, the molded article satisfying the following requirements (1) through (4):
Requirement (1) Lc/La≤1.50
Requirement (2) Lc≥10.0
Requirement (3) F$_1$≥0.07
Requirement (4) F$_2$≥0.06
wherein in Requirements (1) through (4),
La denotes the distance (unit: nm) between crystalline lamellae calculated from the long-period distance calculated from a small-angle X-ray scattering profile and the degree of crystallization calculated from the amount of heat of fusion measured by differential scanning calorimetry,
Lc denotes the thickness (unit: nm) of a crystalline lamella calculated from the distance between crystalline lamellae and the long-period distance,
F$_1$ denotes the degree of orientation calculated from the infrared dichroic ratio measured at a wave number of 997 cm$^{-1}$, and
F$_2$ denotes the degree of orientation calculated from the infrared dichroic ratio measured at a wave number of 973 cm$^{-1}$.

2. A molded article made of a propylene-based resin, the molded article satisfying the following requirements (2) through (5):
Requirement (2) Lc≥10.0
Requirement (3) F$_1$≥0.07
Requirement (4) F$_2$≥0.06
Requirement (5) La≥8.5
wherein in Requirements (2) to (5),
La denotes the distance (unit: nm) between crystalline lamellae calculated from the long-period distance calculated from a small-angle X-ray scattering profile and the degree of crystallization calculated from the amount of heat of fusion measured by differential scanning calorimetry,
Lc denotes the thickness (unit: nm) of a crystalline lamella calculated from the distance between crystalline lamellae and the long-period distance,
F$_1$ denotes the degree of orientation calculated from the infrared dichroic ratio measured at a wave number of 997 cm$^{-1}$, and
F$_2$ denotes the degree of orientation calculated from the infrared dichroic ratio measured at a wave number of 973 cm$^{-1}$.

3. The propylene-based resin molded article according to claim 1 or 2, wherein the melt flow rate of the propylene-based resin measured in accordance with ASTM D1238 is 5 g/10 min or less.

4. A method for producing a molded article made of a propylene-based resin, the method comprising:
a filling step of filling a propylene-based resin into a mold cavity of an injection molding machine having a maximum injection pressure of P, and
a pressure holding step of further pressurizing the propylene-based resin filled into the mold cavity at a pressure of 15% or more of the maximum injection pressure and holding the propylene-based resin under this pressure,
wherein the melt flow rate of the propylene-based resin as measured in accordance with ASTM D1238 is more than 0 g/10 min but not more than 5 g/10 min, and
the propylene-based resin molded article satisfies the following requirements (1) through (4):
Requirement (1) Lc/La≤1.50
Requirement (2) Lc≥10.0
Requirement (3) F$_1$≥0.07
Requirement (4) F$_2$≥0.06
wherein in Requirements (1) through (4),
La denotes the distance (unit: nm) between crystalline lamellae calculated from the long-period distance calculated from a small-angle X-ray scattering profile and the degree of crystallization calculated from the amount of heat of fusion measured by differential scanning calorimetry,
Lc denotes the thickness (unit: nm) of a crystalline lamella calculated from the distance between crystalline lamellae and the long-period distance,
F$_1$ denotes the degree of orientation calculated from the infrared dichroic ratio measured at a wave number of 997 cm$^{-1}$, and
F$_2$ denotes the degree of orientation calculated from the infrared dichroic ratio measured at a wave number of 973 cm$^{-1}$.

5. A method for producing a molded article made of a propylene-based resin, the method comprising:
a filling step of filling a propylene-based resin into a mold cavity of an injection molding machine having a maximum injection pressure of P, and
a pressure holding step of further pressurizing the propylene-based resin filled into the mold cavity at a pressure of 15% or more of the maximum injection pressure and holding the propylene-based resin under this pressure,
wherein the melt flow rate of the propylene-based resin as measured in accordance with ASTM D1238 is more than 0 g/10 min but not more than 5 g/10 min, and
the propylene-based resin molded article satisfies the following requirements (2) through (5):

Requirement (2) $Lc \geq 10.0$
Requirement (3) $F_1 \geq 0.07$
Requirement (4) $F_2 \geq 0.06$
Requirement (5) $La \geq 8.5$
wherein in Requirements (2) to (5),
- La denotes the distance (unit: nm) between crystalline lamellae calculated from the long-period distance calculated from a small-angle X-ray scattering profile and the degree of crystallization calculated from the amount of heat of fusion measured by differential scanning calorimetry,
- Lc denotes the thickness (unit: nm) of a crystalline lamella calculated from the distance between crystalline lamellae and the long-period distance,
- $F_1$ denotes the degree of orientation calculated from the infrared dichroic ratio measured at a wave number of 997 $cm^{-1}$, and
- $F_2$ denotes the degree of orientation calculated from the infrared dichroic ratio measured at a wave number of 973 $cm_{-1}$.

6. The method for producing a molded article according to claim 4 or 5, further comprising a thermal treatment step of thermally treating a molded article precursor formed via the pressure holding step.

* * * * *